(12) United States Patent
Hatakeyama et al.

(10) Patent No.: US 6,665,120 B2
(45) Date of Patent: *Dec. 16, 2003

(54) REFLECTIVE OPTICAL ELEMENT

(75) Inventors: Hideyuki Hatakeyama, Yokohama (JP); Masanobu Ohgane, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,320

(22) Filed: Sep. 13, 1999

(65) Prior Publication Data

US 2003/0026994 A1 Feb. 6, 2003

(30) Foreign Application Priority Data

Sep. 16, 1998 (JP) .............................. 10-261796

(51) Int. Cl.$^7$ ............................. G02B 1/10; G02B 5/08
(52) U.S. Cl. ..................... 359/581; 359/585; 359/883; 359/884
(58) Field of Search .................................. 428/457, 461; 359/580, 584, 883, 884, 870, 839, 856, 857, 859, 351, 360, 581, 585, 861

(56) References Cited

U.S. PATENT DOCUMENTS

| | | | | | |
|---|---|---|---|---|---|
| 3,637,294 A | * | 1/1972 | Berthold, III | ................ | 359/582 |
| 3,887,261 A | * | 6/1975 | Spiller | ......................... | 359/580 |
| 4,309,075 A | * | 1/1982 | Apfel et al. | ................. | 359/586 |
| 4,340,646 A | * | 7/1982 | Ohno et al. | ................. | 359/884 |
| 4,547,432 A | * | 10/1985 | Pitts et al. | ................... | 428/448 |
| 4,900,137 A | * | 2/1990 | Carter | ......................... | 359/488 |
| 5,392,156 A | | 2/1995 | Kumagai et al. | ............ | 359/586 |
| 5,981,059 A | * | 11/1999 | Bright et al. | ................ | 428/336 |
| 5,982,546 A | * | 11/1999 | Kawamoto et al. | ...... | 428/912.2 |
| 5,995,287 A | * | 11/1999 | Sekita | ......................... | 359/599 |

FOREIGN PATENT DOCUMENTS

JP            09-90229         4/1997

OTHER PUBLICATIONS

A. Vaškelis, et al., "Structure of electroless silver coatings obtained using cobalt(II) as reducing agent", Surface and Coatings technology 82 (1996) 165–168.

* cited by examiner

Primary Examiner—Monique R Jackson
(74) Attorney, Agent, or Firm—Fitzpatrick, Cella, Harper & Scinto

(57) ABSTRACT

The present invention provides a reflective optical element being excellent in reflectivity and transmittance having a metallic thin film being excellent in durability and abrasion resistance wherein, in the reflective optical element in which light impinges in the transparent substrate and projects out after repeating reflection on the back plane, the reflection plane is formed by laminating the transparent substrate, metallic thin film and amorphous fluorocarbon resin in this order while forming a layer of the amorphous fluorocarbon resin on the incident and projection planes simultaneously with forming the layer on the outermost layer to allow durability and abrasion resistance to be improved with the amorphous fluorocarbon resin on the reflection plane, silver being deposited on the metallic layer by electroless plating in depositing the films while the amorphous fluorocarbon resin being preferably deposited by a wet film-deposition method such as a dip-coating method.

5 Claims, 5 Drawing Sheets

- 13 FILM OF AMORPHOUS FLUOROCARBON RESIN
- 12 METAL FILM
- 11 TRANSPARENT SUBSTRATE

- 36 FILM OF AMORPHOUS FLUOROCARBON RESIN
- 35 THIN FILM OF ALUMINUM
- 34 THIN FILM OF $SiO_2$
- 33 THIN FILM OF $TiO_2$
- 32 THIN FILM OF $SiO_2$
- 31 ACRYLIC RESIN SUBSTRATE

- 43 FILM OF AMORPHOUS FLUOROCARBON RESIN
- 42 SILVER FILM
- 41 TRANSPARENT SUBSTRATE

- 53 FILM OF AMORPHOUS FLUOROCARBON RESIN
- 52 Ag FILM (150 nm)
- 51 TRANSPARENT SUBSTRATE

- 84a FLUOROCARBON OIL
- 83a FILM OF AMORPHOUS FLUOROCARBON RESIN
- 82 METAL FILM
- 81 TRANSPARENT SUBSTRATE

- 83b FILM OF AMORPHOUS FLUOROCARBON
- 12 METAL FILM
- 11 TRANSPARENT SUBSTRATE

REFLECTIVE OPTICAL ELEMENT

BACKGROUND OF THE INVENTION

1. Field of the Invention

The present invention relates to a reflective optical element, especially to a reflection film formed on the reflection plane of the reflective optical element.

2. Description of the Related Art

Thin films of metals such as aluminum and silver having a high reflectivity have been used for the reflection film to be formed on the reflection plane of conventional reflective optical elements. Silver has so high a reflectivity at the visible wavelength region, that it is frequently used for mirrors and reflective optical elements.

The thin films of metals such as aluminum and silver have been usually deposited by vacuum deposition, sputtering and ion plating.

While the metallic thin film to be formed on the reflection plane of the reflective optical element may be used as a monolayer, it may be laminated with an antioxidation film for preventing the metallic thin film from being oxidized, and a reflection increment film for improving reflective characteristics of the metallic thin film.

However, the reflective optical elements and reflection films as described in the prior art have problems.

First, durability and abrasion resistance of the metallic thin film should be improved.

It is also a problem that the surface of the metallic thin film is liable to be oxidized to form a metal oxide film by an oxidation reaction, reducing its reflectivity.

Decrease of reflectivity due to the oxidation reaction of the metal surface tends to be accelerated by deposition of moisture on the surface of a metal when the film is placed in an environment of room temperature and ambient humidity after it has been allowed to stand in a high temperature and high humidity atmosphere for a long period of time, or when the film is abruptly exposed to a cold environment.

Since the metallic thin film, especially the silver thin film, has a soft surface, abrasion resistance of the film becomes very low when the film is used while its surface is exposed to outside, failing to obtain a desired reflectivity due to abrasion of the metallic thin film.

SUMMARY OF THE INVENTION

Accordingly, the object of the present invention is to provide a reflective optical element whose reflectivity is not decreased by allowing it to leave in a high temperature and high humidity condition for a long period of time.

Another object of the present invention is to provide a reflective optical element having good abrasion resistance.

In one aspect, the present invention provides a reflective optical element having at least one or more of metallic thin layers on a monolayer or a multi-layer of the thin film layers formed on a peripheral surface of a transparent substrate to obtain a desired reflection of light by allowing the light incident from the transparent substrate side, or the light advancing in the transparent substrate, to reflect with the metallic thin film, wherein the thin films formed on the peripheral surface of the transparent substrate comprise the metallic thin film and an amorphous fluorocarbon resin laminated from at least the transparent substrate side. Laminating the amorphous fluorocarbon resin on the metallic thin film in the present invention provides a reflective optical element whose metallic thin film has good durability and abrasion resistance.

The metallic thin film formed on the peripheral surface of the reflective optical element is coated with a resin layer comprising the amorphous fluorocarbon resin in the reflective optical element according to the present invention to render the thin film water-repelling property with the amorphous fluorocarbon resin, thereby moisture adhered on the surface of the optical element does not reach the metallic thin film situated inside of the amorphous fluorocarbon resin. It is also made possible to reduce deposition of moisture on the surface of the optical element accompanied by environmental changes such as from an environment of high temperature and high humidity to an environment of room temperature and ambient humidity, or from an environment of room temperature and ambient humidity to a cold environment. These effects allow formation of metal oxides due to an oxidation reaction of the metallic thin film to reduce, preventing reduction of reflectivity of the metallic thin film caused by forming metal oxides. Also, it is made possible to improve abrasion resistance of the metallic thin film by coating the periphery of a film having a soft surface such as a thin film of silver, enabling durability of the optical element to be improved.

DESCRIPTION OF THE PREFERRED EMBODIMENT

Figure 1:
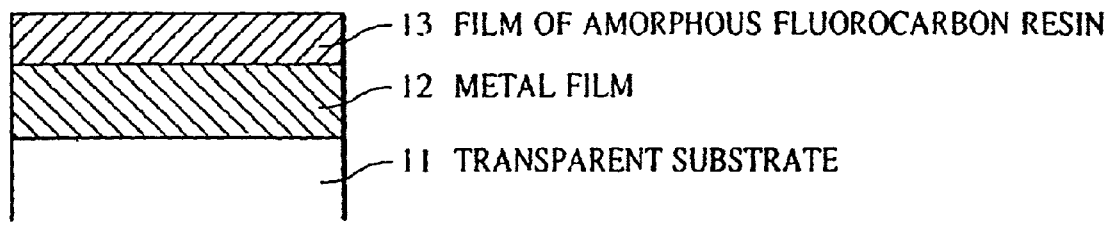
FIG. 1 shows the construction of the reflection film according to the present invention.

It is preferable in the reflective optical element according to the present invention that the metallic thin film comprises silver, the thin film of silver being formed by a wet deposition method; the wet deposition method of the silver thin film is an electroless silver plating method; the silver thin film formed by the electroless plating method has reflectivity in the range of 80 to 99.5% (at a wavelength range of 350 nm to 900 nm) and a film thickness in the range of 50 nm to 1000 nm; the layer of a low friction substance is formed on the outer surface of the amorphous fluorocarbon resin, or the low friction substance is contained in the amorphous fluorocarbon resin; and the reflective optical element has intermediate layers in which films having high reflectivity and films having low reflectivity are laminated between the transparent substrate and metallic thin film at least from the substrate side.

It is also preferable that light impinges from at least one plane of a transparent substrate into the transparent substrate, repeats reflecting from the back plane in the transparent substrate, and projects out of the transparent substrate through planes other than the plane of the transparent substrate from which the light has impinged, wherein the reflection films contributing to back plane reflection in the transparent substrate are constructed by laminating a metallic thin film and an amorphous fluorocarbon resin in this order of at least from the transparent substrate.

Also, it is preferable that anti-reflection films comprising the amorphous fluorocarbon resin are formed on the light incidence plane and light projection plane.

Also, it is preferable that the anti-reflection films are formed simultaneously with forming a thin film of the amorphous fluorocarbon resin formed on the periphery of the reflection plane.

Using the amorphous fluorocarbon resin as the anti-reflection layer has been disclosed in U.S. Pat. No. 5,392, 156.

An amorphous structure of the amorphous transparent fluorocarbon resin to be used in the present invention can be confirmed by the fact that a transparent film is formed after deposition. The structure is also recognizable from the fact that any crystalline phases are not substantially observed by X-ray crystal structure analysis.

Examples of the preferable amorphous transparent fluorocarbon resin insoluble in organic solvents include a polymer having a repeating main chain unit as described below (m, m', n, and n' denote positive integers);

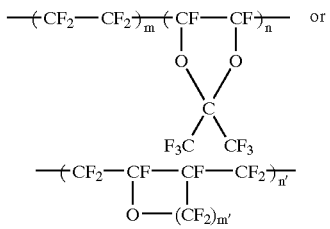

one or more sites of the fluorine atoms in this repeating unit being substituted with at least one group selected from an amino group, an aldehyde group, a carboxyl group, an alcohol group, a silanol group, a phosphonyl group, a sulfonyl group, a cyano group, a nitro group, a vinyl group, an epoxy group, and a fluorine containing compound such as a perfluoroalkyl group, perfluoroalkylether group and perfluoroalkene group having functional groups in their terminals. Alternately, a fluorocarbon polymer resin comprising a copolymer of a repeating unit as shown in the formula above, with a repeating unit in which one or more sites of the fluorine atoms in this repeating unit being substituted with at least one group selected from an amino group, an aldehyde group, a carboxyl group, an alcohol group, a silanol group, a phosphoryl group, a sulfonyl group, a cyano group, a nitro group, a vinyl group, an epoxy group, and a fluorine containing compound such as a perfluoroalkyl group, perfluoroalkylether group and perfluoroalkene group having functional groups in their terminals, may be used.

Examples of the functional groups bound to the terminal of the fluorinated compound described above include an amino group, an aldehyde group, a carboxyl group, an alcohol group, a silanol group, a phosphoryl group, a sulfonyl group, a cyano group, a nitro group, a vinyl group, and an epoxy group.

The amorphous and transparent fluorocarbon resin described above is soluble in aromatic solvents such as toluene, ketones such as methylethyl ketone, esters such as isobutyl acetate, ethers such as diisopropyl ether, alcohols such as isopropyl alcohol, or a mixed organic solvent thereof, or fluorinated hydrocarbon solvents such as tetradecafluoro-hexane and octadecafluoro-decane. The fluorinated hydrocarbon solvents are especially suitable for depositing a film of the amorphous and transparent fluorocarbon resin by dip coating or spin coating since the solvents do not penetrate into the first layer comprising a polymer resin with high reflectivity, and have high solubility to the amorphous transparent fluorocarbon resin.

Although the transparent substrates are not especially limited so long as they have sufficient rigidity and transparency for use in the optical element, inorganic substrates such as a glass and plastic substrates such as an acrylic resin, polycarbonate and amorphous polyolefin may be used.

While the film thickness of the amorphous fluorocarbon resin film is not especially limited, a film thickness of 50 nm or more is preferable as will be described hereinafter in order to allow the film to serve as an anti-oxidation and protective film of the metallic thin film.

The metallic thin film is preferably composed of silver. While silver exhibits higher reflectivity at the visible wavelength region than any other metals, it has a drawback that it is liable to be oxidized to deteriorate reflectivity by forming silver oxide. However, since oxidation of silver can be suppressed by coating the silver thin film with the amorphous fluorocarbon resin while preventing decrease of reflectivity as described above, it is possible to provide a reflective optical element effectively taking advantage of reflectivity of silver under various environments.

The silver reflection film is preferably deposited by a wet deposition method when the configuration of the optical element is complicated or the element has a large size. The silver thin film may be deposited by a dry deposition method such as vacuum deposition, sputtering, and ion plating. In compliance with miniaturization, heteromorphic configurations and complicated shapes of the currently available optical elements, production steps should be increased, and production facilities should be made to be complicated and large scale to inevitably increase film deposition costs. However, simultaneous film deposition of plural planes for the optical elements having complicated shapes using a simpler equipment as compared with the conventional dry film deposition apparatus are made possible by using the wet film deposition method, enabling the film deposition cost to be largely reduced.

While the wet film deposition method of the silver thin film as used herein refers to the methods by silver mirror reaction, electroplating and electroless plating, it is especially preferable to use the electroless plating method.

A conductive layer to serve as an electrical contact point should be previously formed on the substrate of the optical element in the electric plating method. Reflectivity from the substrate side after forming a silver film becomes lower than reflectivity of the surface formed by other deposition methods when transparency of the substance to be used for the conductive layer is insufficient or the layer has rather poor conductivity.

Although the silver mirror reaction is very useful because it is a quite common method and investments for the production facilities may be saved, the reaction is so abrupt that the reaction product should be promptly processed. A selective reaction on the optical element is difficult since the mirror reaction proceeds in the entire reaction solution, wasting the reaction solution as well as forming a silver film with uneven film thickness.

It is possible in the electroless plating method, on the contrary, to selectively deposit silver on the optical substrate and to control the reaction rate depending on the composition of the plating bath, besides avoiding waste of the plating bath and forming a quite uniform silver film. The method is also advantageous for obtaining very small diversity of reflectivity over the entire optical element.

The electroless plating method is in general applied by allowing a metal to deposit on the substrate by adding a catalytic amount of a metal or metal ion in order to allow the metal deposition reaction of the plating bath to proceed on the substrate, followed by immersing the substrate supplemented with the catalyst into the plating bath.

Although the metal or metal ion as a catalyst for allowing the metal deposition reaction on the substrate to proceed is not especially limited so long as the silver deposition reaction can proceed in the electroless plating bath containing silver, metals such as gold, silver, copper, palladium, cobalt, tin and nickel, or ions thereof, and a colloid solution containing a metal ion thereof may be used.

A pre-treatment may be applied to the surface of the optical substrate in order to uniformly supply the metal or metal ion as a catalyst. The metal and metal ion as a catalyst can be uniformly supplied to the optical element by the pre-treatment methods on the surface of the optical element include various treatment methods for lowering the surface energy of the substrate such as an etching with an acid or alkali, a UV-$O_3$ treatment, a corona discharge treatment and an excimer irradiation treatment, or a treatment for making the surface of the substrate hydrophilic with a substance having functional groups represented by surfactants, or by a method using a combination of the methods described above.

The metal ion as a catalyst may have a weak absorptive power to the substrate to precipitate in the plating bath, sometimes accelerating decomposition of the plating bath. It is preferable in such cases to immobilize the metal as a catalyst on the substrate by reducing the metal ion as a catalyst. Reducing agents to be used for this purpose are not especially limited.

The electroless plating bath is composed of soluble silver ions, a reducing agent for allowing silver ions to deposit on the optical element by reducing the ion, a chelating agent for stabilizing the plating bath by forming a chelate with silver ions, and a pH adjustment agent for preventing a driving force of the plating reaction from decreasing due to increased hydrogen ions ascribed to an oxidation reaction of the reducing agent.

Although the reducing agent is not especially limited provided that the agent is a substance capable of reducing silver ions dissolved in the plating bath, formaldehyde, Rochelle salt, hydrazine, and hydrazine borane are usually used. Cobalt sulfonate may be also used as described by A. Vaskelis et al in Surface and Coating Technology 82 (1996), p165 to 168.

The chelating agent is also not especially limited provided that it has abilities for forming a chelate with silver ions dissolved in the plating bath, for suppressing the deposition reaction of silver in the plating bath, and readily depositing silver on the substrate owing to the catalyst supplied to the substrate, cyan compounds may be advantageously used. However, since cyan compounds are very dangerous, a special caution for handling is required. Therefore, ammonia or ammonia derivatives may be used as the chelating agents as described in the publication cited above.

It is preferable for the silver thin film formed by the electroless silver plating to have reflectivity of 80 to 100% (in the wavelength region of 350 nm to 900 nm) and a film thickness of 50 nm to 1000 nm.

When reflectivity is lower than 80%, luminous energy is largely decreased in the reflective optical element in which light is repeatedly reflected. It is preferable to provide the silver film with reflectivity of 80% or more, and that the silver film formed by electroless plating has a thickness of 50 nm or more. When the thickness of the silver film is less than 50 nm, desired reflectivity cannot be obtained because light passes through the silver film especially in the short wavelength side of the visible region.

The silver film formed on the optical element preferably has a film thickness of 1000 nm or less. Many of the reflective optical elements having a complex shape have curved planes on the element. Therefore, cracks at the periphery of the curved surfaces will be often generated due to lamination stress of the silver film when the film is formed by electroless plating. However, these phenomena are controllable by making the film thickness of the silver film to be thinner than 1000 nm.

With respect to the amorphous fluorocarbon resin located on the outer layer of the metallic thin film formed on the substrate of the optical element, a layer comprising a low friction substance may be formed on the outer layer of the resin layer, or the low friction substance may be added in the amorphous fluorocarbon resin. The procedures above allow the surface of the amorphous fluorocarbon resin to exhibit low friction, thereby further improving abrasion resistance of the reflective optical element as compared with the element having a layer comprising merely the amorphous fluorocarbon resin. While the low friction substance described above is not especially limited so long as it is compatible with the amorphous fluorocarbon resin, use of fluorocarbon oils is especially preferable.

A primer layer for bonding the amorphous fluorocarbon resin to the layer positioned on the inner layer may be used as an intermediate layer in forming the amorphous fluorocarbon resin layer.

In the reflective optical element, in which light impinges from at least one plane of a transparent substrate into the transparent substrate and repeats reflection from the back plane in the transparent substrate, and projects out of the transparent substrate through planes other than the plane of the transparent substrate from which the light has impinged, the reflection film contributing to reflection from the back plane in the element is constituted by laminating at least a transparent substrate, a metallic thin film and an amorphous fluorocarbon resin in this order, thereby suppressing reflectivity of the silver thin film from decreasing due to deterioration of durability and abrasion resistance of the metallic thin film to consequently prevent overall transmittance of the reflective optical element from decreasing.

Also, in the reflective optical element, in which light impinges from at least one plane of a transparent substrate into the transparent substrate and repeats reflection from the back plane in the transparent substrate, and projects out of the transparent substrate through planes other than the plane of the transparent substrate from which the light has impinged, the reflection film contributing to reflection from the back plane in the element is constituted by laminating at least a transparent substrate, a metallic thin film and an amorphous fluorocarbon resin in this order while forming anti-reflection films comprising the amorphous fluorocarbon resin on the incidence plane and projection plane of the reflective optical element.

The amorphous fluorocarbon resin has a very low refractive index of 1.3 to 1.38. Therefore, it is effective for reducing reflection of light at the interface of the transmission plane to form a resin film by adjusting its film thickness to be odd number multiples of one fourth of the light wavelength. The overall transmittance of the reflective optical element may be improved by forming the anti-reflection film comprising the amorphous fluorocarbon resin with an appropriate thickness on the incidence plane and projection plane of the reflective optical element.

It is possible to form the anti-reflection film comprising the amorphous fluorocarbon resin simultaneously with forming the amorphous fluorocarbon resin layer to be formed on the metallic thin film of the reflection film using a dip-coating method. Simultaneously forming the amorphous fluorocarbon resin layers on the incidence plane, projection plane and metallic reflection film allows the layer contributing to durability and abrasion resistance of the metallic thin film and the anti-reflection film to be simultaneously obtained and saving time.

It is preferable that the amorphous fluorocarbon resin to be formed on the incidence plane and projection plane has at least a film thickness of 60 nm to 170 nm. Adjusting the film thickness of the amorphous fluorocarbon resin to the thickness as described above allows a reflective optical element with excellent overall transmittance in the visible region to be obtained.

EXAMPLE 1 AND COMPARATIVE EXAMPLE 1

FIG. 1 shows a basic construction of the reflection film of the reflective optical element according to the present invention. A metallic thin film 12 is formed on the transparent substrate 11, and a thin film 13 of the amorphous fluorocarbon resin is formed on the peripheral surface of the metallic thin film.

Figure 2:
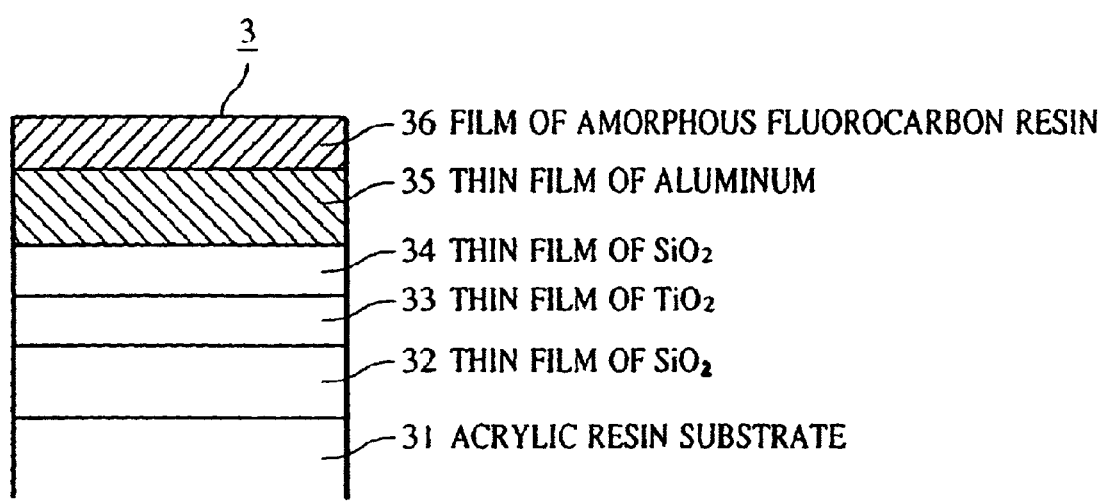
FIG. 2 shows the reflective optical element in Example 1.

A construction of the reflection film of the reflective optical element according to the present invention is shown in FIG. 2.

A $SiO_2$ film 32 (250 nm), a $TiO_2$ film 33 (120 nm), a $SiO_2$ film 34 (120 nm) and an aluminum thin film 35 (100 nm) as a metallic film were successively formed on a transparent acrylic substrate 31 by a vacuum deposition method. The $SiO_2$ film 32 serves as an adhesion layer contributing to adhesion of the acrylic substrate 31 with the $TiO_2$ film 33, while the $TiO_2$ film 33 and $SiO_2$ film 34 serve as reflection increment films for enhancing reflectivity of the reflection film of the reflective optical element.

After coating a primer (trade name: CT-P, made by Asahi Glass Work, Co.) for adhering the aluminum thin film with the amorphous fluorocarbon resin on the reflective optical element having the aluminum thin film on its outermost layer by the dip-coating method followed by drying in the air, a solution of the amorphous fluorocarbon resin (trade name: CTX, made by Asahi Glass Work, Co.) is also coated by the dip-coating method, followed by drying and firing at 80° C. for 30 minutes to form a film 36 of the amorphous fluorocarbon resin to obtain a reflective optical element 3 according to the present invention.

The reflective optical element 3 prepared in this example was subjected to an abrasion resistance test and a high temperature and high humidity durability test. The results are shown in TABLE 1.

Figure 3:
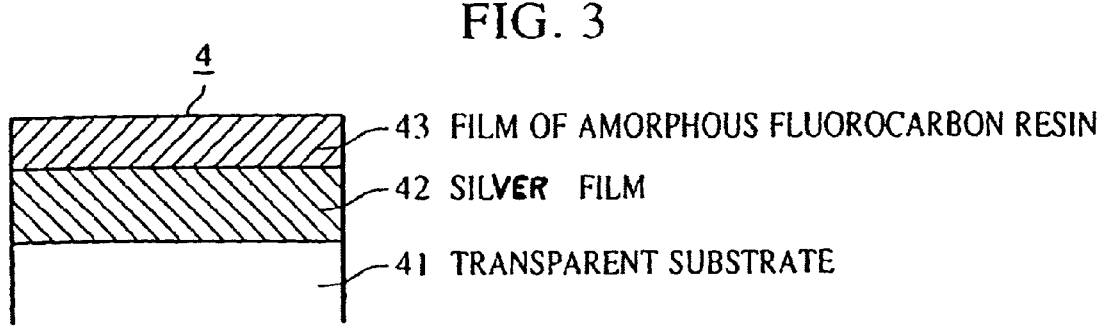
FIG. 3 shows the reflective optical element in Example 2.

An optical element, having no film 36 of the amorphous fluorocarbon resin on the reflective optical element shown in FIG. 3, was used as Comparative Example 1.

Flaws were observed in the abrasion resistance tests before and after the durability test using the sample in Comparative Example 1. No abrasion was observed, on the contrary, in the abrasion tests before and after the durability test in the experiment using the sample in Example 1. No decrease of reflectivity was observed after the durability test.

TABLE 1

| | BEFORE DURABILITY TEST AT HIGH TEMPERATURE AND HIGH HUMIDITY | | | | AFTER DURABILITY TEST AT HIGH TEMPERATURE AND HIGH HUMIDITY | | | |
|---|---|---|---|---|---|---|---|---|
| | ABRASION RESISTANCE | REFLECTIVITY ON BACK FACE | | | ABRASION RESISTANCE | REFLECTIVITY ON BACK FACE | | |
| | | 450 nm | 550 nm | 650 nm | | 450 nm | 550 nm | 650 nm |
| EXAMPLE 1 | o | 90.4% | 91.7% | 89.9% | o | o | o | o |
| COMPARATIVE EXAMPLE 1 | x (FLAWS) | 90.4% | 91.7% | 89.9% | x (FLAWS) | 78.5% | 82.1% | 81.3% |

Durability test at high temperature and high humidity: allowed to stand in an environment of 60° C. and 90% RH for 1000 hours
Abrasion resistance test: Cellulose paper (trade name Dusper; made by OZU Co. Ltd.), 300 g load, 30 times of reciprocal rubbing
o No abrasion, x Abrasion
Reflectivity: measured at an incident angle of 5° using Hitachi Spectrophotometer
o No change of reflectivity, x Decrease of reflectivity

EXAMPLE 2

Construction of the reflection film of the reflective optical element according to this example is shown in FIG. 3.

After applying a corona discharge treatment on a transparent acrylic substrate 41, a silver thin film 42 was formed on the transparent substrate 41 by a silver mirror reaction. The thickness of the silver thin film was 200 nm.

The silver mirror reaction was carried out as follows.

After dissolving 60 g of silver nitrate in 1 litter of pure water with stirring, an aqueous ammonia solution with a concentration of 28% was added dropwise until the solution once assumed a brown color and had turned transparent. The amount of dropwise addition of the aqueous ammonia solution was about 60 g. The acrylic substrate 41 was dipped in the silver solution described above and an aqueous formaldehyde solution with a concentration of 10% was added dropwise with stirring to deposit silver on the substrate by the silver mirror reaction.

A primer (CT-P, made by Asahi Glass Work Co., Ltd.) was coated on the acrylic substrate 41, on the surface of which a silver thin film 42 had been deposited by the silver mirror reaction, by the dip-coating method followed by drying in the air for allowing the silver thin film to adhere with an amorphous fluorocarbon resin. A solution of the amorphous fluorocarbon resin (trade name: CTX, made by Asahi Glass Work Co., Ltd.) was also coated by the dip-coating method followed by drying and firing at 80° C. for 30 minutes to form a film 43 of the amorphous fluorocarbon resin to obtain a reflective optical element 4 according to this example.

The reflective optical element 4 according to this example exhibited higher reflectivity as compared with the reflective optical element using aluminum for the metallic thin film. The effect was evident especially at a wavelength of 500 nm or more.

An abrasion resistance test and high temperature and high humidity durability test were applied to the reflective optical element 4 according to this example. The results are listed in TABLE 2.

No abrasion was observed before and after the abrasion resistance test in the experiments in Example 2. No decrease of reflectivity was observed as well after the durability test.

TABLE 2

| | BEFORE DURABILITY TEST AT HIGH TEMPERATURE AND HIGH HUMIDITY | | | | AFTER DURABILITY TEST AT HIGH TEMPERATURE AND HIGH HUMIDITY | | | |
|---|---|---|---|---|---|---|---|---|
| | ABRASION RESISTANCE | REFLECTIVITY ON BACK FACE | | | ABRASION RESISTANCE | REFLECTIVITY ON BACK FACE | | |
| | | 450 nm | 550 nm | 650 nm | | 450 nm | 550 nm | 650 nm |
| EXAMPLE 2 | o | 92.5% | 95.1% | 96.2% | o | o | o | o |

Durability test at high temperature and high humidity: allowed to stand in an environment of 60° C. and 90% RH for 1000 hours
Abrasion resistance test: Cellulose paper (trade name Dusper; made by OZU Co. Ltd.), 300 g load, 30 times of reciprocal rubbing
o No abrasion, x Abrasion
Reflectivity: measured at an incident angle of 5° using Hitachi Spectrophotometer
o No change of reflectivity, x Decrease of reflectivity

EXAMPLE 3

Figure 4:
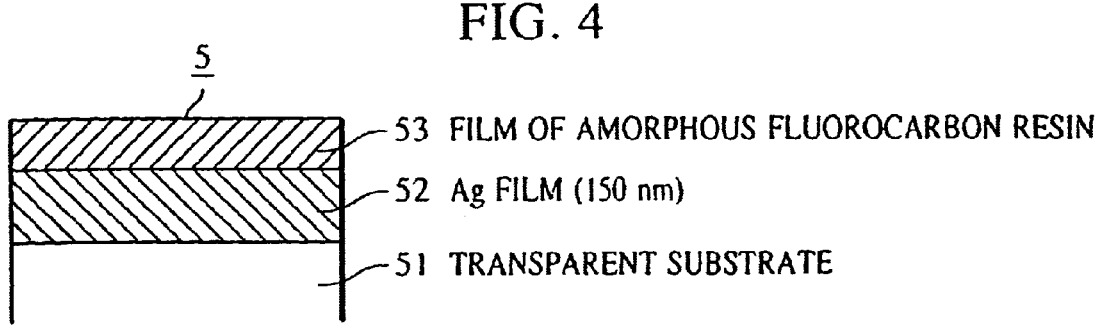
FIG. 4 shows the reflective optical element in Example 3.

Film construction of the reflective optical element according to this example and the film deposition method will be described with reference to FIG. 4 and FIG. 5.

Figure 5:
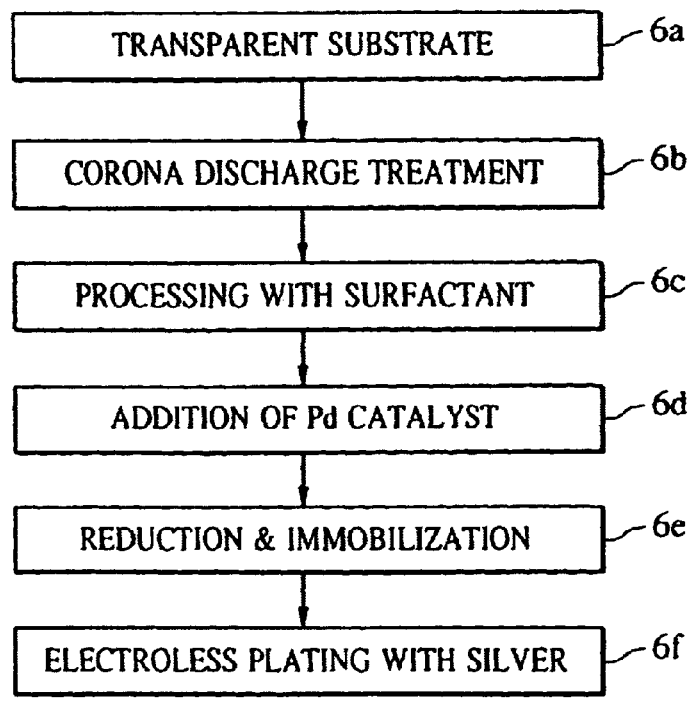
FIG. 5 shows an example of the electroless silver plating steps.

Electroless silver plating was carried out for depositing a silver thin film 52 (150 nm) on the transparent substrate 51 of amorphous polyolefine following the steps in FIG. 5.

The surface of the transparent substrate (step 6a) of amorphous polyolefine was subjected to a corona discharge surface treatment (step 6b). The substrate was dipped in an aqueous solution of a surfactant (trade name: Predip Neoganth B; made by Atotech Japan Co., Ltd.) in a concentration of 20 ml/litter for one minute (step 6c), followed by dipping in an aqueous solution of a surfactant (trade name: Activator Neoganth 834, made by Atotech Japan Co., Ltd.) at 35° C. for five minutes for endowing the substrate with a palladium catalyst (step 6d). The substrate was washed with water for two minutes after the treatment, and was dipped in an aqueous solution of a reducing agent (trade name: Reducer Neoganth WA, made by Atotech Japan Co., Ltd.) in a concentration of 5 ml/litter for reducing palladium ion (step 6e). After washing the substrate again with water for two minutes, the substrate was dipped in an electroless silver plating bath with a composition listed in TABLE 3 for electroless silver plating of the substrate (step 6f).

The reflective optical element 5 according to this example was obtained by forming an amorphous fluorocarbon resin film 53 on the reflective optical element having a silver thin film on its outermost layer by the same method as used in Example 1.

The reflective optical element 5 prepared in this example was subjected to an abrasion resistance test and high temperature and high humidity durability test. The results of substrate-selective silver deposition are shown in Table 4.

There were no problems in the results of the abrasion resistance test and high temperature and high humidity durability test in Example 3 and Example 2. However, no substrate-selective silver deposition was observed in the silver mirror reaction in Example 2, wasting excess silver. However, deposition was substrate-selective in the electroless plating method in this example, observing no deposition of waste silver.

TABLE 3

| COMPOSITION AND CONDITION | CONCENTRATION AND CONDITION |
|---|---|
| SILVER NITRATE | 6.8 g/l |
| COBALT SULFATE HEPTAHYDRATE | 28 g/l |
| AQUEOUS AMMONIA 2.8% | 121 g/l |
| AMMONIUM SULFATE | 99 g/l |
| pH | 10.0 |
| TEMPERATURE | ROOM TEMPERATURE |

TABLE 4

| | | | BEFORE DURABILITY TEST AT HIGH TEMPERATURE AND HIGH HUMIDITY | | | | BEFORE DURABILITY TEST AT HIGH TEMPERATURE AND HIGH HUMIDITY | | | |
|---|---|---|---|---|---|---|---|---|---|---|
| | SUBSTRATE SELECTIVITY | ABRASION RESISTANCE | REFLECTIVITY ON BACK FACE | | | ABRASION RESISTANCE | REFLECTIVITY ON BACK FACE | | | |
| | | | 450 nm | 550 nm | 650 nm | | 450 nm | 550 nm | 650 nm | |
| EXAMPLE 3 | o | o | 92.5% | 95.2% | 96.2% | o | o | o | o | |

Substrate selectivity: yes o, no x
High temperature and high humidity test: allowed to stand in an environment with a temperature of 60° C. and RH of 90% for 1000 hours
Abrasion resistance test: Cellulose paper (trade name Dusper; made by OZU Co. Ltd.), 300 g load, 30 times of reciprocal rubbing
o No abrasion, x Abrasion
Reflectivity: measured at an incident angle of 5° using Hitachi Spectrophotometer
o: No change of reflectivity, x: Decrease of reflectivity

EXAMPLE 4

Figure 6A:
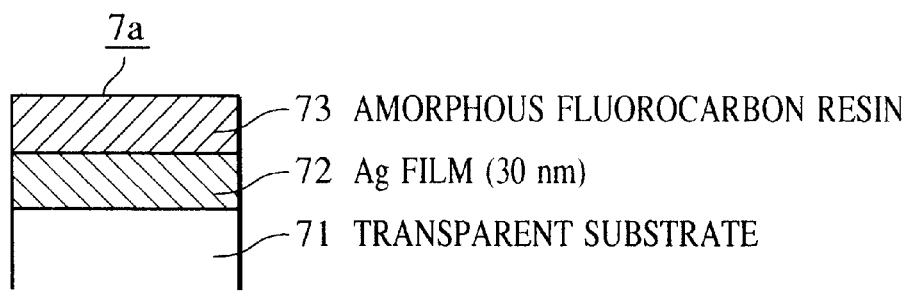
FIG. 6A through FIG. 6C denote the reflective optical element in Example 4.
Figure 6B:
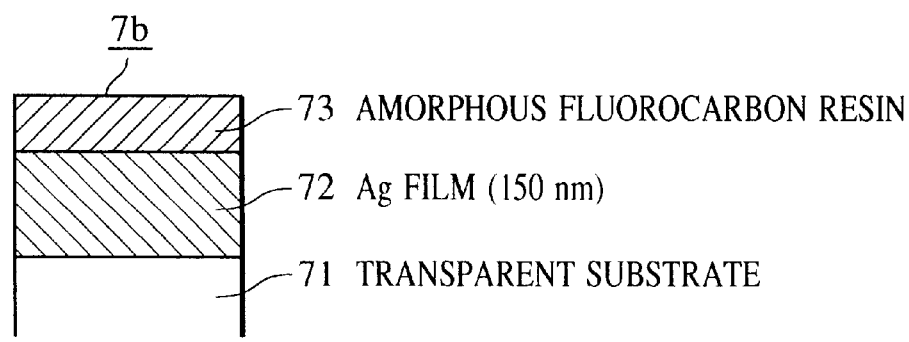
Figure 6C:
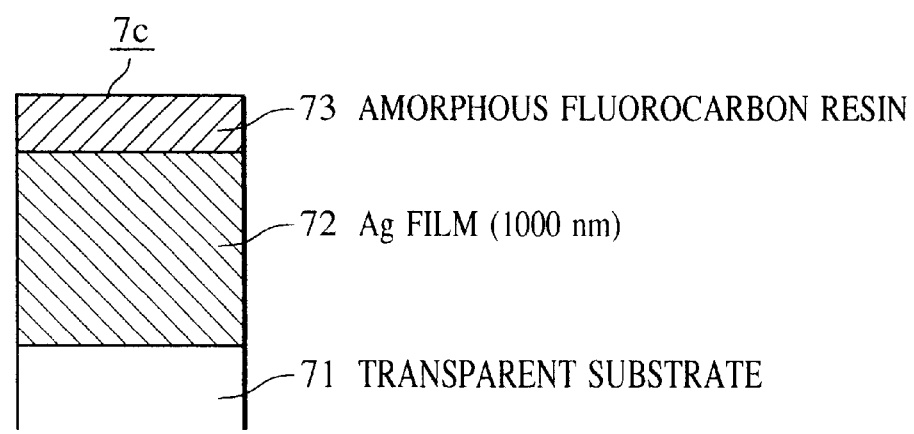

The construction of the reflective optical element according to this example is shown in FIG. 6A through FIG. 6C.

Silver thin films 72 (FIG. 6A: 30 nm, FIG. 6B: 150 nm, FIG. 6C: 1100 nm) were formed on a transparent substrate 71 of amorphous polyolefine by an electroless silver plating method, and amorphous fluorocarbon resin films 73 were formed by a dip-coating method to obtain reflective optical elements in FIGS. 6A, 6B and 6c.

Although reflectivity of 80% or more cannot be obtained in the reflective optical element having a thin film as shown in FIG. 6A, reflectivity of 80% or more was obtained in the reflective optical elements having thick films as shown in FIGS. 6B and 6C, respectively. Generation of cracks was observed, on the contrary, in the film of the reflective optical elements having a thick film as shown in FIG. 6C, uniform silver films were formed in the reflective optical elements having thin film as shown in FIGS. 6A and 6B.

EXAMPLE 5 AND COMPARATIVE EXAMPLE 2

Figure 7A:
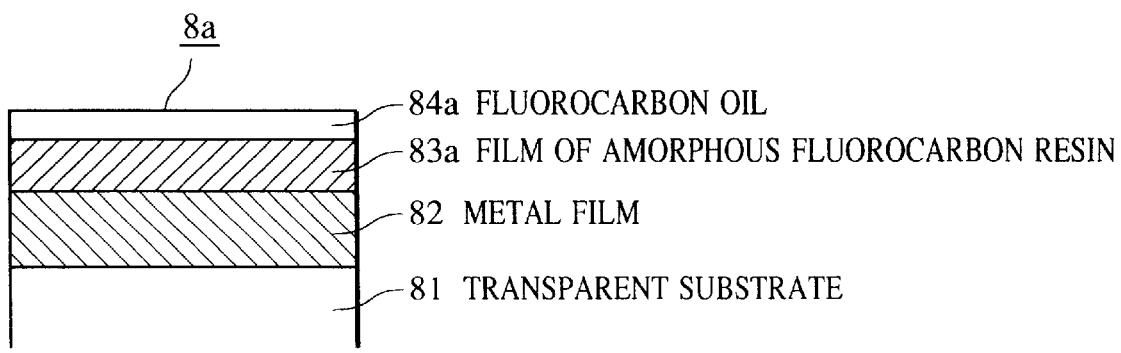
FIGS. 7A and 7B denote the reflective optical element in Example 5.
Figure 7B:
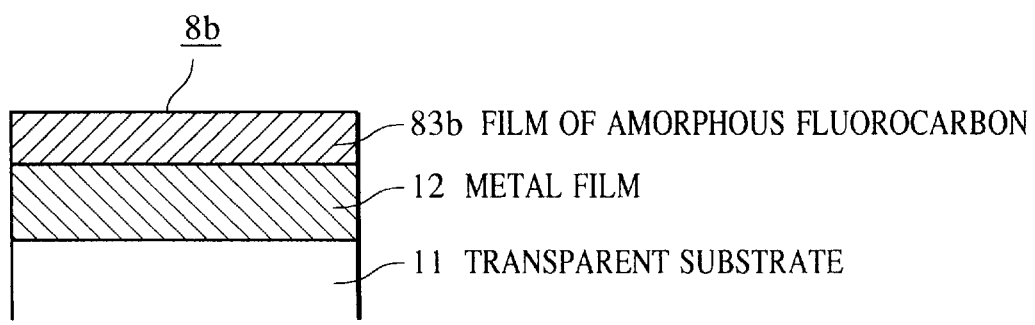

The film construction of the reflective optical element according to this example is shown in FIGS. 7A and 7B.

A silver thin film was deposited on a transparent substrate of amorphous polyolefine by electroless plating using the same method in the foregoing examples.

A primer (trade name: CT-P) for allowing the silver thin plate to adhere with the amorphous fluorocarbon resin was coated on a transparent substrate 81, on the surface of which a silver thin film 82 was deposited by electroless plating, by a dip-coating method. After drying the coating film in the air, a solution of the amorphous fluorocarbon resin (trade name: CTX) was also coated on the substrate by the dip-coating method, followed by drying and firing at 80° C. for 30 minutes to form an amorphous fluorocarbon resin film 83a. Then, a fluorocarbon oil for making the surface have low friction was coated to a thickness of 10 nm, obtaining the reflective optical element 8a according to this example after drying.

A primer (CT-P) for allowing the silver thin plate to adhere with the amorphous fluorocarbon resin was coated on a transparent substrate 81, on the surface of which a silver thin film 82 was deposited by electroless plating, by a dip-coating method. After drying the coating film in the air, a solution of the amorphous fluorocarbon resin (trade name: CTWX, made by Asahi Glass Work Co., Ltd.), in which a fluorocarbon oil had been dissolved, was also coated on the substrate by the dip-coating method, followed by drying and firing at 80° C. for 30 minutes to form an amorphous fluorocarbon resin film 83b, obtaining the reflective optical element 8b according to this example after drying.

Abrasion tests of the surface were carried out using the reflective optical element 5 according to Example 3, in which an amorphous fluorocarbon resin film containing no fluorocarbon oil was formed on the silver thin film, and a reflective optical element as a comparative example having no amorphous fluorocarbon resin film.

The results indicated that the reflective optical elements 8a and 8b exhibit excellent abrasion resistance as compared with the reflective optical element in the comparative example.

TABLE 5

| | FILM CONSTRUCTION | ABRASION RESISTANCE TEST |
|---|---|---|
| 8a | TRANSPARENT SUBSTRATE/ SILVER THIN FILM/ AMORPHOUS FLUOROCARBON RESIN/ FLUOROCARBON OIL | 500 g LOAD, 50 TIMES OF RECIPROCAING RUBBING NO ABRASION WAS OBSERVED |
| 8b | TRANSPARENT SUBSTRATE/ AMORPHOUS FLUOROCARBON RESIN CONTAINING FLUOROCARBON OIL | 500 g LOAD, 50 TIMES OF RECIPROCAING RUBBING NO ABRASION WAS OBSERVED |
| EXAMPLE 3 | TRANSPARENT SUBSTRATE/ SILVER THIN FILM/ AMORPHOUS FLUOROCARBON RESIN | 300 g LOAD, 50 TIMES OF RECIPROCAING RUBBING NO ABRASION WAS OBSERVED |
| COMPARATIVE EXAMPLE 2 | TRANSPARENT SUBSTRATE/ SILVER THIN FILM | 300 g LOAD, 50 TIMES OF RECIPROCAING RUBBING ABRASION WAS OBSERVED |

EXAMPLE 6 AND COMPARATIVE EXAMPLE 3

Figure 8:
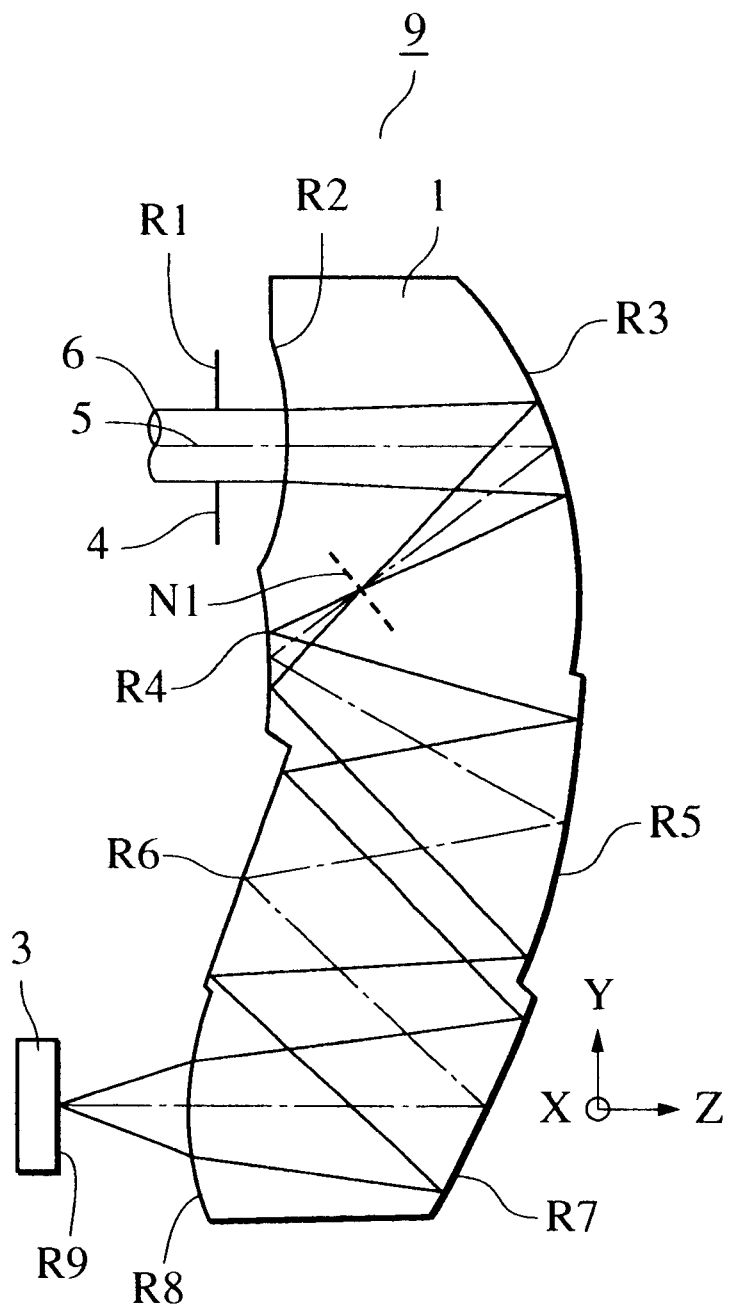
FIG. 8 shows the reflective optical element in Example 6.

The reflective optical element according to this example is shown in FIG. 8. FIG. 8 also illustrates the optical path of the light flux on the optical axis of the reflective optical element. The reference numeral 1 in the drawing denotes an optical element in which plural reflection planes having a curvature are integrated. The optical element 1 is composed of a concave diffraction plane (incidence planes) R2, five reflection planes of a concave mirror R3, a convex mirror R4, a concave mirror R5, a convex mirror R6 and a concave mirror R7, and a convex diffraction plane (a projection plane) R8 arranged in this order from an imaging subject. The direction of the reference axis incident to this optical element 1, and the direction of the reference axis projecting out of the optical element 1 are in parallel relation with each other but the directions are inverse with each other. The reference numeral 3 denotes an imaging element such as a CCD and the reference numeral R9 denotes its light-receiving plane. The reference numeral 4 (R1) denotes a diaphragm disposed at the imaging subject side while the reference numeral 5 denotes the reference axis of the optical element 1. Two diffraction planes assume spherical planes with a rotational symmetry, and all the reflection planes are anamorphic planes being symmetrical to the YZ-plane.

The image forming mechanism of this example will be described hereinafter. The light flux 6 impinging along the reference axis 5 impinges the concave diffraction plane R2 of the optical element 1 after the incident luminous energy has been controlled by the diaphragm 4 (R1). The light flux 6 impinging the concave diffraction plane R2 is projected as a divergent light flux by the power of the concave diffraction plane R2 and is reflected with the concave mirror R3, followed by forming a primary image of the imaging subject on an intermediate imaging plane N1 by the power of the concave mirror. Imaging the imaging subject in the optical element 1 at the early stage of imaging suppresses the effective flux diameter on the planes disposed within the imaging side from the diaphragm 4 to be increased.

The light flux 6 of the imaging subject forming a primary image on the intermediate imaging plane N1 repeats reflecting on the convex mirror R4, concave mirror R5, convex mirror R6 and concave mirror R7, and arrives at the convex diffraction plane R8 while suffering optical interaction by the power of each reflection mirrors. The light flux is finally An optical element having no amorphous fluorocarbon resin film was used as Comparative Example 3 in the reflective optical element shown in FIG. 8.

The reflective optical element in this example showed transmittance superior to that in the comparative example before subjecting to the tests.

No abrasion was observed in the abrasion resistance test of the reflective optical element according to this example before and after the durability test. Decrease of transmittance was also not observed after the durability test.

TABLE 6

| | BEFORE DURABILITY TEST AT HIGH TEMPERATURE AND HIGH HUMIDITY | | | | AFTER DURABILITY TEST AT HIGH TEMPERATURE AND HIGH HUMIDITY | | | |
|---|---|---|---|---|---|---|---|---|
| | ABRASION | REFLECTIVITY ON BACK FACE | | | ABRASION | REFLECTIVITY ON BACK FACE | | |
| | RESISTANCE | 450 nm | 550 nm | 650 nm | RESISTANCE | 450 nm | 550 nm | 650 nm |
| EXAMPLE 6 | o | 66% | 76% | 80% | o | o | o | o |
| COMPARATIVE EXAMPLE 3 | x (FLAWS) | 62% | 71% | 75% | x (FLAWS) | 54% | 67% | 71% |

Durability test at high temperature and high humidity: allowed to stand in an environment of 60° C. and 90% RH for 1000 hours
Abrasion resistance test: Cellulose paper (trade name Dusper; made by OZU Co. Ltd.), 300 g load, 30 times of reciprocal rubbing
o No abrasion, x Abrasion
Reflectivity: measured at an incident angle of 5° using Hitachi Spectrophotometer
o No change of reflectivity, x Decrease of reflectivity focused on the light receiving plane R9 by being diffracted by the power of the convex diffraction plane R8 to form an image of the imaging subject.

The light flux in the optical element 1 repeats diffraction on the incident and projection planes and reflection on a plural reflection mirrors having a curvature to finally arrive at the light receiving plane R9 as hitherto described, exhibiting a desired optical performance to totally serve as a lens unit having a positive power.

The direction of the reference axis incident to this optical element 1, and the direction of the reference axis projecting out of the optical element 1 are in parallel relation with each other but the directions are inverse with each other. All the reference axes including the incidence and projection axes are placed on the plane of the drawing (YZ-plane).

The optical element disclosed herein is described in Japanese Patent Laid-open No. 9-90229. A reflective optical element was obtained in this example by forming masks on the incidence and projection planes while forming a silver thin film on the outermost layer on the reflection plane using the steps in FIG. 5. After removing the mask, the amorphous fluorocarbon resin is simultaneously applied on the outermost layer, and on the incidence and projection planes, thereby obtaining the reflective optical element 9 according to this example.

The reflective optical element 9 prepared in this example was subjected to a friction resistance test and high temperature and high humidity durability test. The results are shown in TABLE 9.

EXAMPLE 7

Transmittance of the reflective optical element 9 described in Example 6 was measured by changing the film thickness of the amorphous fluorocarbon resin formed on the outermost layer of the reflection film, and on the incidence and projection planes.

The results showed that sufficiently high transmittance for use in the optical element could be obtained when the film thickness of the amorphous fluorocarbon resin is in the range of 60 nm to 170 nm.

What is claimed is:

1. A reflective optical element in which light impinges from at least one plane of a transparent substrate into the transparent substrate, repeats reflecting from the back plane in the transparent substrate, and projects out of the transparent substrate through planes other than the plane of the transparent substrate from which the light has impinged, wherein reflection film contributing to back plane reflection in the transparent substrate is a thin metallic film which is constructed by laminating between the transparent substrate and an amorphous fluorocarbon resin, and wherein an anti-reflection film comprising the amorphous fluorocarbon resin having film thickness of 60 nm to 170 nm is formed on the light incidence plane and light projection plane and wherein the thin metallic film has (a) a reflectivity from 80 to 99.5% at a wavelength range of 350 nm to 900 nm and (b) a film thickness from 50 nm to 1,000 nm.

2. A reflective optical element according to claim 1 wherein the thin metallic film comprises silver, the thin silver film being formed by a wet deposition method.

3. A reflective optical element according to claim 2, wherein the wet deposition method of the thin silver film is an electroless silver plating.

4. A reflective optical element according to claim 1, wherein a layer of a low friction substance is formed on the outer space of the amorphous fluorocarbon resin, or the low friction substance is added in the amorphous fluorocarbon resin.

5. A reflective optical element according to one of claims 1 or 2 having intermediate layers in which a film having high refractivity and a film having low refractivity are laminated between the transparent substrate and thin metallic film at least from the substrate side.

* * * * *